US012643671B2

(12) United States Patent
Raucoules et al.

(10) Patent No.: US 12,643,671 B2
(45) Date of Patent: Jun. 2, 2026

(54) AIRCRAFT PROPULSION ASSEMBLY

(71) Applicant: SAFRAN TRANSMISSION SYSTEMS, Colombes (FR)

(72) Inventors: Clément Raucoules, Moissy-Cramayel (FR); Boris Pierre Marcel Morelli, Moissy-Cramayel (FR); Jordane Emile André Peltier, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 18/264,544

(22) PCT Filed: Feb. 1, 2022

(86) PCT No.: PCT/FR2022/050187
§ 371 (c)(1),
(2) Date: Aug. 7, 2023

(87) PCT Pub. No.: WO2022/171945
PCT Pub. Date: Aug. 18, 2022

(65) Prior Publication Data
US 2024/0043134 A1 Feb. 8, 2024

(30) Foreign Application Priority Data
Feb. 10, 2021 (FR) ...................................... 2101261

(51) Int. Cl.
*B64D 35/08* (2025.01)
*B64D 35/021* (2024.01)
*B64D 35/04* (2006.01)

(52) U.S. Cl.
CPC ........... *B64D 35/08* (2013.01); *B64D 35/021* (2024.01); *B64D 35/04* (2013.01)

(58) Field of Classification Search
CPC ....... B64D 35/021; B64D 35/04; B64D 35/08
See application file for complete search history.

(56) References Cited

U.S. PATENT DOCUMENTS 1,150,233 A * 8/1915 Swales ................... B64D 35/04
244/13
4,955,561 A * 9/1990 Seefluth ................. B64D 35/08
74/665 K (Continued)

FOREIGN PATENT DOCUMENTS

DE 509143 C * 10/1930
WO 02053403 A2 7/2002

OTHER PUBLICATIONS

International Search Report and Written Opinion issued in International Application No. PCT/FR2022/050187, issued on May 6, 2022.

(Continued)

*Primary Examiner* — Magdalena Topolski
(74) *Attorney, Agent, or Firm* — Bookoff McAndrews, PLLC

(57) ABSTRACT

A propulsion assembly for an aircraft comprising at least two electric motors configured to be disposed in a wing of the aircraft and each comprising a rotor having a motor shaft movable about a motor axis, at least one propeller borne by a propeller shaft movable about a propeller axis and mechanically coupled to the motor shaft of the at least two electric motors, the propeller axis being perpendicular to the motor axis of the at least two electric motors.

9 Claims, 5 Drawing Sheets

(56) References Cited

U.S. PATENT DOCUMENTS

| | | | |
|---|---|---|---|
| 10,343,787 B2 | 7/2019 | Davis et al. | |
| 10,351,252 B2 * | 7/2019 | Reigner | F16H 48/05 |
| 2003/0075643 A1 * | 4/2003 | Dunn | B64D 27/355 |
| | | | 244/59 |
| 2008/0006739 A1 * | 1/2008 | Mochida | H02K 16/00 |
| | | | 267/136 |
| 2012/0234968 A1 * | 9/2012 | Smith | B64C 27/82 |
| | | | 244/12.3 |
| 2013/0231208 A1 | 9/2013 | Buono et al. | |
| 2017/0190435 A1 * | 7/2017 | Kobayashi | H02P 29/10 |
| 2019/0344877 A1 | 11/2019 | Gilliland et al. | |
| 2021/0039796 A1 * | 2/2021 | Hirabayashi | B64D 35/08 |
| 2022/0033071 A1 * | 2/2022 | Spierling | B64C 27/28 |

OTHER PUBLICATIONS

Search Report issued in French Application No. 21 01261, issued on Oct. 21, 2021.

* cited by examiner

[Fig. 1]
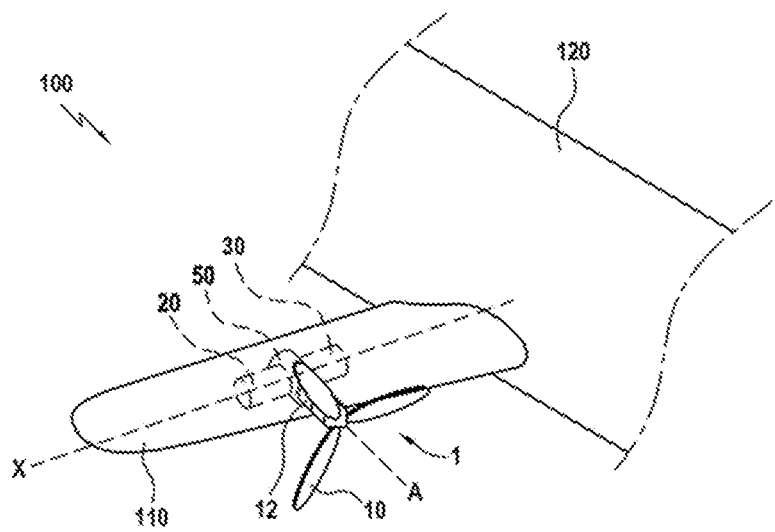
[Fig. 2]
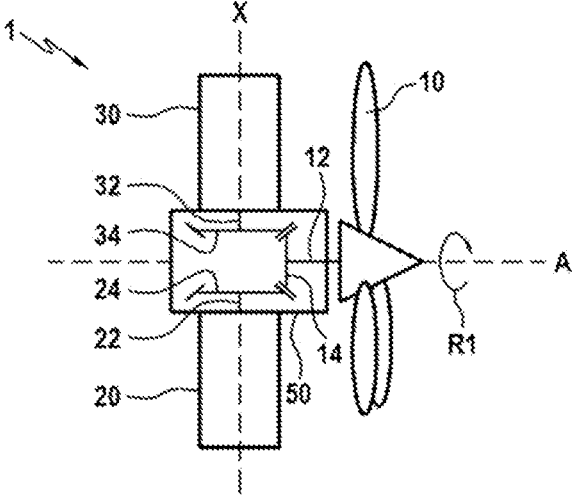

[Fig. 3]
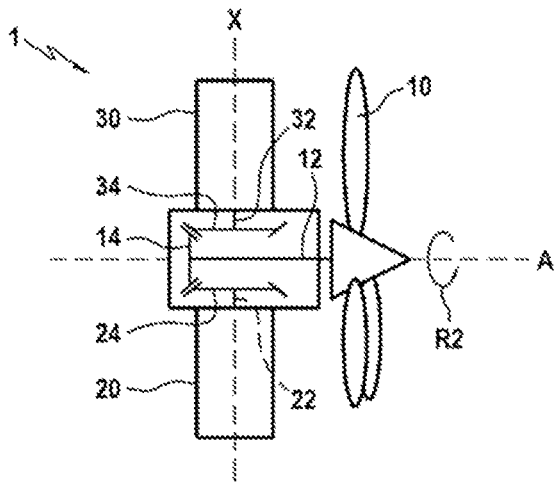
[Fig. 4A-4B]
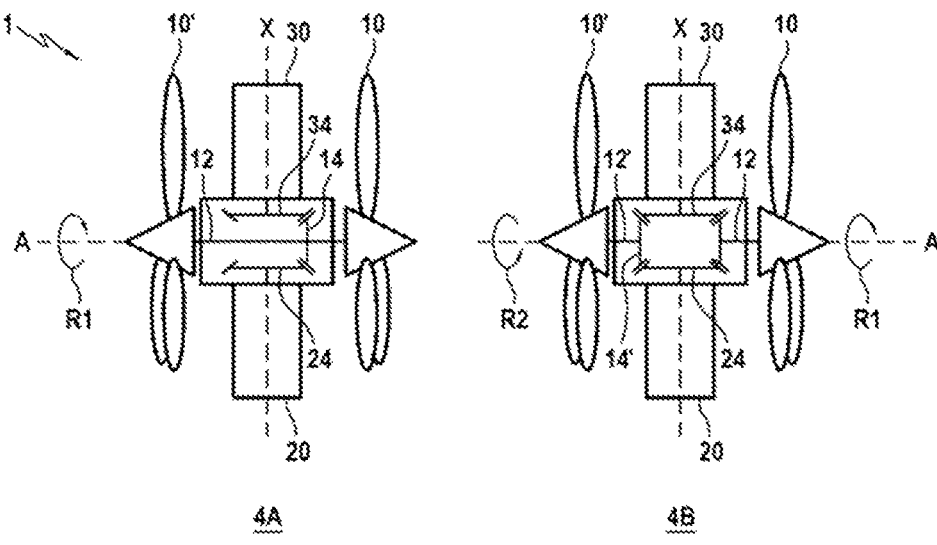
4A                                        4B

[Fig. 5]
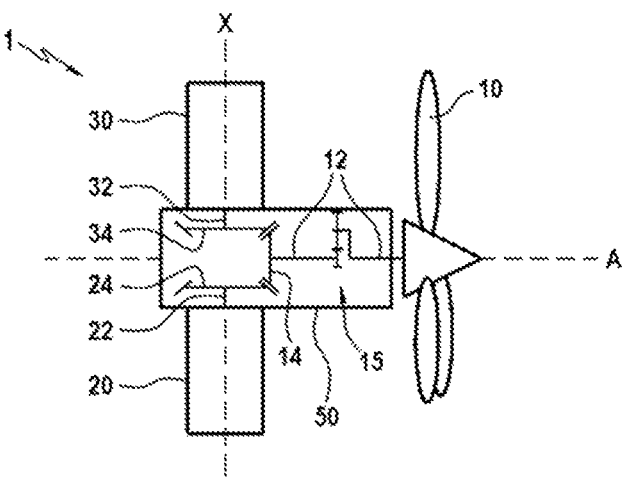
[Fig. 6A-6B]
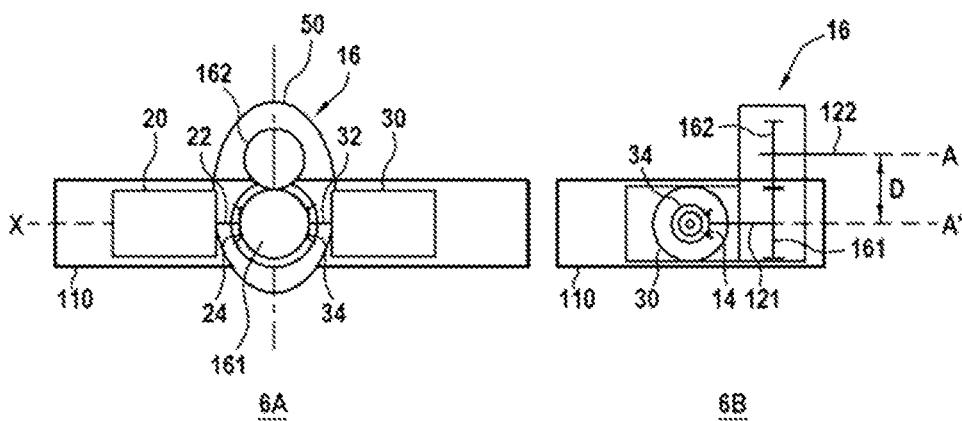
6A                           6B

[Fig. 7A-7C]
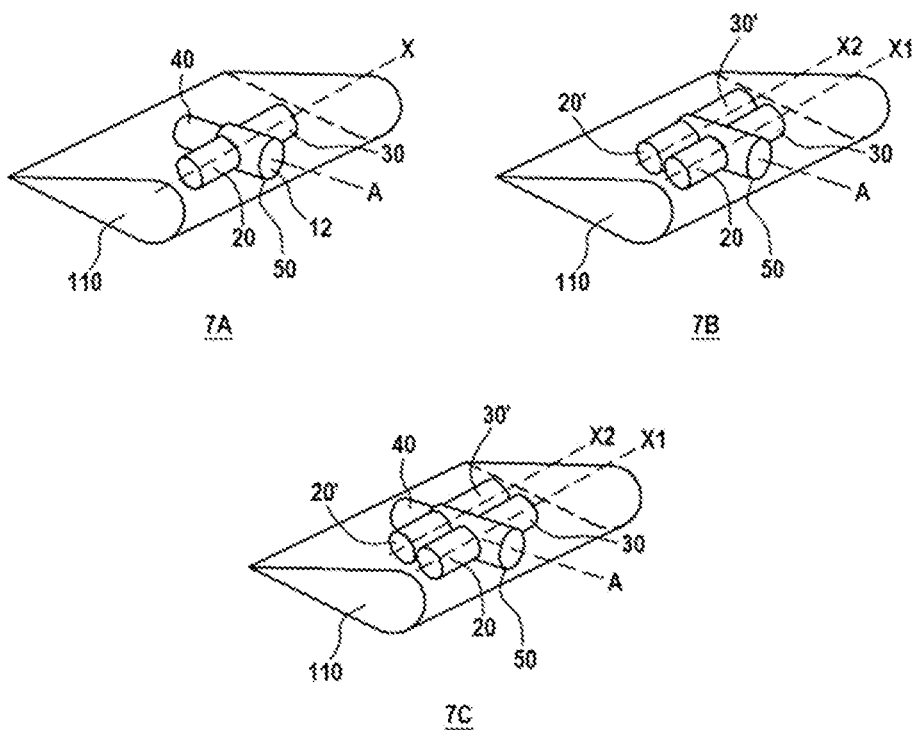
7A
7B
7C
[Fig. 8]
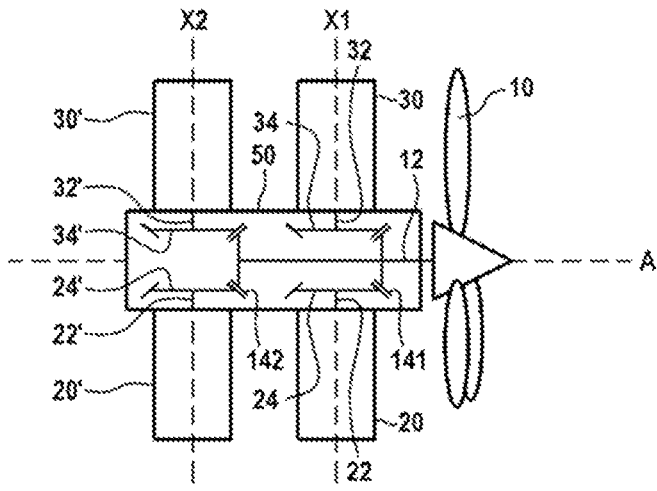

[Fig. 9]
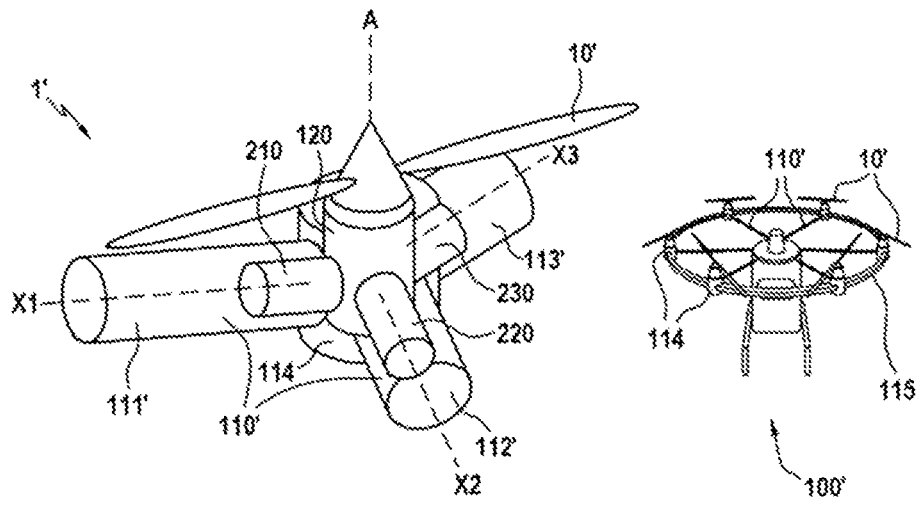
[Fig. 10]
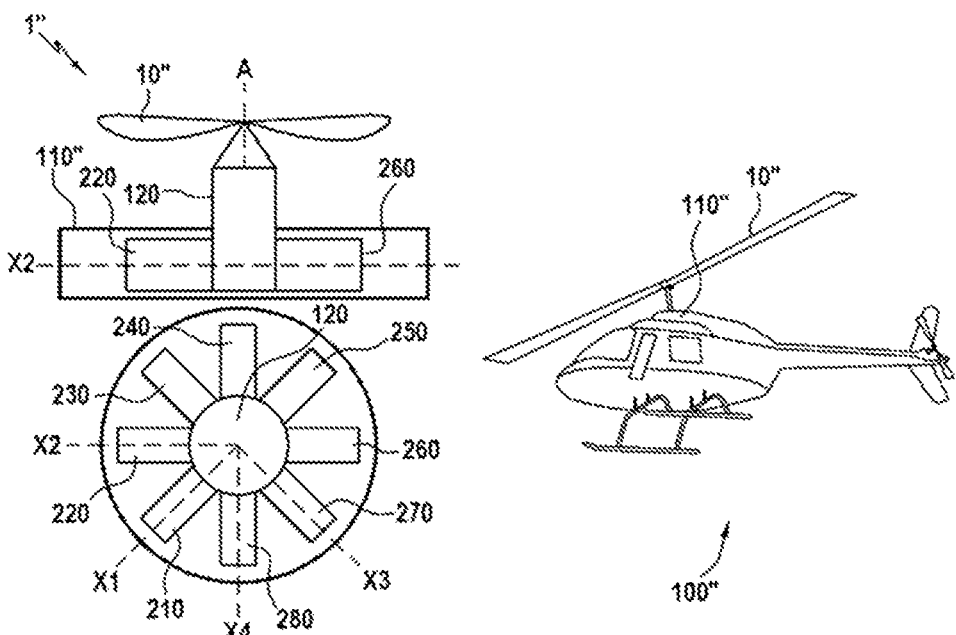

AIRCRAFT PROPULSION ASSEMBLY

CROSS-REFERENCE TO RELATED APPLICATIONS

This is a National Stage Application under 35 U.S.C. § 371 of International Application No. PCT/FR2022/050187, filed Feb. 1, 2022, now published as WO 2022/171945 A1, which claims priority to French Patent Application No. 2101261, filed on Feb. 10, 2021.

TECHNICAL FIELD

This invention relates to the general field of propulsion devices for electric motors intended to be disposed in wings of aeronautical machines such as electric propulsion airplanes, but not only those aircraft. The invention in particular relates to a propulsion assembly for an aircraft comprising such electric motors, and an aircraft comprising this propulsion assembly.

PRIOR ART

So-called "e-Propeller" propulsion systems, comprising an electric motor driving a rotating propeller, particularly by way of a mechanical power transmission, are used in a known manner in the field of aeronautics. In particular, these "e-Propeller" propulsion systems can be used on drones, air taxis, small electric or thermal/electric hybrid airplanes. In the latter two scenarios, the "e-Propeller" systems are generally distributed along the wings or on the wing tip. The electrical energy comes from the battery (all-electric) or via a generator driven by a thermal motor (hybrid).

The placement of these "ePropeller" propulsion systems is not conventional and raises new integration problems. Moreover, the increase in power requirements and redundancy requirements tends to significantly increase the number of electric motors required. However, the motors of these different existing propulsion systems generally have large diameters and lengths, making them complex to integrate. Furthermore, certain motor architectures, requiring in particular the presence of reduction gears, give rise to a significant increase in bulk, particularly in the event of several motors or several propellers being used. This bulk greatly penalizes the aerodynamic performance of the aircraft. These different limitations make these systems complex to integrate into aircraft wings.

There is therefore a need for a propulsion system for an aircraft, comprising electric motors, making it possible to overcome, at least in part, the aforementioned drawbacks.

SUMMARY OF THE INVENTION

This summary relates to a propulsion assembly for an aircraft comprising:
- at least two electric motors configured to be disposed in a wing of the aircraft and each comprising a rotor having a motor shaft movable about a motor axis,
- at least one propeller borne by a propeller shaft movable about a propeller axis and mechanically coupled to the motor shaft of the at least two electric motors, the propeller axis being perpendicular to the motor axis of the at least two electric motors.

It will be understood that the propeller shaft is coupled to each one of the electric motors by way of the motor shaft of each of them. The propeller is therefore rotationally driven by each of the motors. The axes of the motors are preferably both centered on the same motor axis and are both perpendicular to the propeller axis.

The architecture defined in this summary allows the integration of the propulsion assembly within a wing of the aircraft, offering the possibility of orienting the electric motors in the direction of the wing, while keeping the propeller perpendicular to the wing. This architecture also makes it possible to use several electric motors and to drive one or two propellers, potentially contra-rotating. In particular, given the fact that the motors are installed perpendicular to the propeller axis, the propeller shaft can be a through shaft and possess a second propeller.

This architecture also makes it possible to reduce drag. Specifically, the profile of a wing is defined to obtain the best aerodynamic performance. It comprises a leading edge which is wide and rounded and gradually tapers to a long thin trailing edge. According to the architecture of this summary, the electric motors can be placed in the leading edge area (in the main direction of the wing) which naturally has the largest volume available. In particular, electric motors according to this summary can be entirely disposed in a region of the wing nearer to the leading edge than to the trailing edge. Conversely, in an architecture of the prior art, wherein the axes of the motors are disposed parallel to the propeller axis, the wing would of necessity have to be thicker locally, between the leading edge and the trailing edge over the length of the motor, to be able to house the latter, thus increasing drag.

Thus, the electric or hybrid thermal/electric propulsion assembly according to this summary is particularly suited to aircraft with electric propulsion such as drones, air taxis, electric helicopters, or electric or hybrid thermal/electric airplanes.

In certain embodiments, the motor shaft of each of the electric motors bears a motor bevel pinion, and the propeller shaft bears at least one propeller bevel pinion meshing with the motor bevel pinion borne by the motor shaft of each of the electric motors.

When the propulsion assembly for example comprises two motors, each electric motor possesses a bevel pinion borne by its motor shaft and coupled to its rotor. The propeller bevel pinion meshes with the two motor bevel pinions thus ensuring the mechanical power transmission from the electric motors to the propeller. According to this architecture wherein the propeller axis is perpendicular to the motor axis, the bevel pinions thus make it possible to provide the angle transmission. This configuration also makes it possible to choose the direction of rotation of the propeller as a function of the positioning of the pinions.

In certain embodiments, a tapered part of the propeller bevel pinion is oriented in an opposite direction to the propeller.

In certain embodiments, a tapered part of the propeller bevel pinion is oriented in the direction of the propeller.

In this summary it will be understood that the bevel pinions have a conical, or frustoconical, shape, and are symmetrical about the axis along which the shaft bearing them extends. Given this conical or frustoconical shape, an axial end of these pinions has a smaller diameter (tapered part) than the opposite axial end.

Thus, according to this embodiment, the tapered part of the propeller bevel pinion can be oriented in an opposite direction to the propeller. In other words, the section of the propeller bevel pinion tapers the further it is from the propeller, along the propeller axis. According to this scenario, the propeller pinion meshes with a first side of the motor bevel pinion of each motor, in such a way that the propeller rotates in a first direction of rotation.

Conversely, the tapered part of the propeller bevel pinion can be oriented in the direction of the propeller. In other words, the section of the propeller bevel pinion tapers the nearer it is to the propeller, along the propeller axis. According to this scenario, the propeller pinion is disposed in a different position on the propeller shaft, along the propeller axis, in such a way as to mesh with a second side, opposite the first side, of the motor bevel pinion of each motor, in such a way that the propeller rotates in a second direction of rotation, opposite the first direction of rotation.

Consequently, according to this architecture wherein the propeller axis is perpendicular to the motor axis, the direction of rotation of the propeller can be chosen independently of the direction of rotation of the electric motors and without increasing the number of parts, by choosing the orientation of the bevel pinion of the propeller shaft.

In certain embodiments, the propeller shaft comprises a mechanical reduction gear disposed between the propeller bevel pinion and the propeller, and configured to reduce the speed of rotation of the propeller with respect to the speed of rotation of the electric motors.

The fact of adding an additional mechanical reduction gear makes it possible to achieve a desired reduction ratio, in the event of the desired reduction ratio not being achievable with a single gear. This mechanical reduction gear can take the form of an epicyclic gear train.

In certain embodiments, the propeller shaft comprises a first portion mechanically coupled to the motor shaft of the electric motors, and a second portion bearing the propeller, the first and second portions being radially offset with respect to one another, and meshing with one another by way of a gear train.

The term "radially offset" should be understood to mean that the first and the second portion of the propeller shaft are offset with respect to one another in a direction perpendicular to the propeller axis, and mesh with one another, preferably by a spur gear train. Thus, the axis of the first portion and the axis of the second portion are mutually parallel, and both perpendicular to the motor axis. This configuration makes it possible to offset the propeller axis with respect to the plane wherein the electric motors are located. When the propulsion assembly is disposed in an aircraft wing, the fact of offsetting the propeller axis with respect to the plane of the wing can make it possible to improve the aerodynamic performance of the machine.

In certain embodiments, the at least two electric motors are disposed on either side of the propeller shaft in such a way as to form a first pair of electric motors, the motor axis being a first motor axis, the propulsion assembly comprising at least a second pair of electric motors each comprising a rotor having a motor shaft movable about a second motor axis parallel to the first motor axis.

The term "disposed on either side" should be understood to mean that a first motor of the pair of motors is disposed on a first side of the propeller shaft, and that a second motor of the pair of motors is disposed on a second side of the propeller shaft, opposite the first side. In other words, the two motors of the pair of motors are disposed facing one another, on each side of the propeller shaft. Furthermore, the rotors of the motors of each pair of motors are centered about one and the same axis. Thus, the rotors of the first pair of motors rotate about the first motor axis, and the rotors of the second pair of motors rotate about the second motor axis. The second motor axis is axially offset with respect to the first motor axis, along the propeller axis.

Thus, the propeller shaft is mechanically coupled with each motor of each pair of motors. This architecture wherein the propeller axis is perpendicular to the motor axis or the motor axes is therefore compatible with multi-motor motorization systems, while retaining a limited bulk, which is very advantageous when the high power requirement requires a significant increase in the number of electric motors.

In certain embodiments, the propeller shaft comprises as many propeller bevel pinions as there are pairs of electric motors.

According to this embodiment, the propeller shaft bears a plurality of propeller bevel pinions axially distributed along the propeller shaft, in such a way that each propeller bevel pinion meshes with the motor bevel pinions of a pair of motors. The mechanical power of the electric motors of each pair of motors can thus be transmitted efficiently to the propeller, while limiting the total bulk.

In certain embodiments, the propulsion assembly comprises a single propeller and an additional electric motor, the motor shaft of the rotor of the additional electric motor being parallel to the propeller shaft and being coupled to one end of the propeller shaft opposite the propeller.

The propeller shaft extends axially between a first and a second end. According to this embodiment, the single propeller is disposed at the first end of the shaft, and the additional electric motor is disposed and coupled to the second end of the propeller shaft. Furthermore, the motor axis of the rotor of this additional motor is parallel, preferably colinear with the propeller axis. It is thus possible to add an additional motor, in addition to the pair or pairs of motors disposed on either side of the propeller shaft, making it possible to obtain an odd number of electric motors. This star architecture thus makes it possible to further increase the number of electric motors, and therefore to increase the total power of the propulsion assembly, while limiting the total bulk.

In certain embodiments, the at least one propeller is a first propeller, the assembly comprising a second propeller disposed at an opposite end of the propeller shaft with respect to the first propeller, and oriented in an opposite direction to the first propeller.

According to this embodiment, the second propeller is disposed on the second axial end of the propeller shaft, and is oriented in an opposite direction to the first propeller. In this scenario, the first and the second propeller are borne by the same propeller shaft, and are coupled to the electric motors by way of the propeller bevel pinion, or propeller bevel pinions when the assembly comprises several pairs of motors. Thus, taking into account this architecture wherein the propeller shaft is perpendicular to the motor axis, it is possible to dispose a through propeller shaft, including a propeller at each of its ends, these propellers being contra-rotating.

In certain embodiments, the at least one propeller is a first propeller and the propeller shaft is a first propeller shaft, the propulsion assembly comprising a second propeller oriented in an opposite direction to the first propeller and borne by a second propeller shaft separate from the first propeller shaft, the second propeller shaft being movable about the propeller axis in an opposite direction of rotation to the first propeller.

According to this embodiment, the first and second propeller are borne by two separate propeller shafts, and are coupled to the electric motors by way of a first and a second propeller bevel pinion respectively borne by each of the propeller shafts. In this scenario, each of the first and second bevel pinions mesh with opposite sides of the motor bevel pinions. Thus, given this architecture wherein the propeller axis is perpendicular to the motor axis, it is possible to dispose two propellers on either side of the assembly, these propellers being contra-rotating.

In certain embodiments, the propulsion assembly comprises at least one uncoupling means configured to uncouple the motors.

In particular, the uncoupling means makes it possible to uncouple the motors of a pair of motors, when one of them is malfunctioning. The uncoupling means can be embodied by adding a free wheel between each electric motor and its bevel pinion, for example.

This summary also relates to an aircraft comprising a wing extending along a main axis and a propulsion assembly according to any of the preceding embodiments, the motor axis of the at least two electric motors being parallel to the main axis of the wing.

The aircraft is preferably an electric propulsion aircraft such as a drone, an air taxi, an electric helicopter, or an electric or hybrid thermal/electric airplane. When the wing is an airplane wing for example, the main axis corresponds to the direction along which the wing extends, from its root to its end. Thus, according to this architecture, the motor axis of the motors is parallel to this main axis, while the propeller axis is perpendicular to the main axis. This architecture thus makes it possible to optimize the integration of the propulsion assembly within the wing of the aircraft while orienting the electric motors in the direction of the wing, and keeping the propeller axis perpendicular to the wing.

BRIEF DESCRIPTION OF THE DRAWINGS

The invention and its advantages will be better understood on reading the detailed description given hereinafter of different embodiments of the invention given by way of non-limiting example. This description refers to the appended pages of figures, wherein:

FIG. 1 is a schematic perspective view of an aircraft portion according to a first embodiment, FIG. 2 schematically represents a top view of a propulsion assembly according to the first embodiment, FIG. 3 shows a first modified example of the propulsion assembly of FIG. 2, FIGS. 4A and 4B respectively show two alternatives of a second modified example of the propulsion assembly of FIG. 2, FIG. 5 shows a third modified example of the propulsion assembly of FIG. 2, FIGS. 6A and 6B show a fourth modified example of the propulsion assembly of FIG. 2, respectively in a front view and in a side view, FIGS. 7A to 7C schematically represent perspective views of different alternatives wherein the propulsion assembly according to the first embodiment comprises more than two electric motors, FIG. 8 schematically represents a detail view of the alternative of FIG. 7B, FIG. 9 is a perspective schematic view of an aircraft, and a portion thereof, according to a second embodiment, FIG. 10 is a perspective schematic view of an aircraft, and a portion thereof, according to a third embodiment.

DESCRIPTION OF THE EMBODIMENTS

In the rest of the summary, a "top view" denotes a view along a direction perpendicular both to the motor axis X and to the propeller axis A, a "front view" denotes a view along a direction parallel to the propeller axis A, and a "side view" denotes a view along a direction parallel to the motor axis X.

A first embodiment of the invention will now be described with reference to FIGS. 1 to 8. According to this embodiment, a propulsion assembly 1 according to this summary is applied to a conventional wing, particularly to a wing 110 of an aircraft 100, attached to the fuselage 120 of the aircraft 100.

The wing 110 extends along a main direction, from its root attached to the fuselage 120, to its end opposite the root. The propulsion assembly 1 comprises two electric motors 20, 30, disposed in the wing 110. The rotors of these motors (not shown) each rotate about the motor axis X, parallel to the main axis of the wing 110. The rotor of the electric motor 20 comprises a motor shaft 22 (not visible in FIG. 1), extending parallel to the motor axis X, and the rotor of the electric motor 30 comprises a motor shaft 32 (not visible on FIG. 1), also extending parallel to the motor axis X. The axes of rotation of the electric motors 20 and 30 are preferably colinear with one another, and coaxial with the motor axis X.

The propulsion assembly 1 further comprises a propeller 10 rotationally movable about a propeller axis A. The propeller 10 is borne by a propeller shaft 12, mechanically coupled to the electric motor 20, and to the electric motor 30, such that the rotation of the rotor of the motors 20, 30 jointly drives the rotation of the propeller 10.

According to this summary, the propeller axis A is disposed perpendicular to the motor axis X. To do so, the mechanical coupling between the propeller shaft 12 and the motors 20 and 30 comprises bevel pinions. More precisely, the motor shaft 22 bears at its end a motor bevel pinion 24, rotationally movable about the motor axis X. Similarly, the motor shaft 32 bears at its end a motor bevel pinion 34, rotationally movable about the motor axis X. In the example illustrated in FIG. 2, the electric motors 20 and 30 form a pair of coaxial electric motors, disposed such that the motor bevel pinions 24 and 34 are facing one another, along the motor axis X.

Moreover, the propeller shaft 12 also bears a propeller bevel pinion 14, rotationally movable about the propeller axis A. The propeller bevel pinion 14 is disposed along the propeller shaft 12, in such a way as to mesh at once with the motor bevel pinion 24 and with the motor bevel pinion 34. The bevel pinions 14, 24 and 34, and the links between the propeller bevel pinion 14 and the motor bevel pinions 32, 34 are schematically represented in FIGS. 2 to 8. Given this architecture wherein the propeller axis A is perpendicular to the motor axis X, the bevel pinions 32, 34 and 14 thus make it possible to embody the angle transmission. Preferably, the ends of the motor shafts and of the propeller shaft, and the bevel pinions, are disposed inside a casing 50 protecting these latters and the mechanical couplings.

In the examples illustrated in FIGS. 2 and 3, an upstream-downstream direction is defined as being the direction approaching the propeller 10, along the propeller axis A. Thus, in the example illustrated in FIG. 2, the propeller bevel pinion 14 meshes with a downstream side of the bevel pinions 32, 34, i.e. on the side of the bevel pinions 32, 34 nearest to the propeller 10. In this configuration, the propeller 10 rotates in a first direction of rotation R1.

Conversely, in the example illustrated in FIG. 3, the propeller bevel pinion 14 meshes with an upstream side of the bevel pinions 32, 34, i.e. on the side of the bevel pinions 32, 34 furthest from the propeller 10. To do so, the propeller bevel pinion 14 is disposed further upstream along the propeller axis A, and is oriented in the opposite direction to the propeller bevel pinion 14 illustrated in FIG. 2. In this configuration, the propeller 10 rotates in a second direction of rotation R2, opposite the first direction of rotation R1. This possibility of modulating the direction of rotation of the propeller 10, by simply moving the propeller bevel pinion 14, is made possible by the architecture of this propulsion assembly, wherein the propeller axis A is perpendicular to the motor axis X.

FIGS. 4A and 4B show modified examples of the propulsion assembly shown in FIG. 2, wherein the propulsion assembly 1 comprises two propellers 10'. In FIG. 4A, the propulsion assembly 1 comprises a single propeller shaft 12, and a single propeller bevel pinion 14. A first propeller 10 is disposed at the downstream end of the propeller shaft 12, and a second propeller 10' is disposed at the upstream end of the propeller shaft 12, the upstream-to-downstream direction corresponding to the left-to-right direction in FIG. 4A. According to this example, the two propellers 10, 10' are contra-rotating, and both rotate in the first direction of rotation R1. In the example of FIG. 4A, the propeller bevel pinion 14 meshes with a downstream side of the motor bevel pinions 24, 34. However, the propeller bevel pinion 14 could also mesh with an upstream side of the motor bevel pinions 24, 34, in such a way that the two propellers 10, 10' both rotate in the second direction of rotation R2.

In the example of FIG. 4B, the propulsion assembly 1 comprises two propeller shafts 12 and 12', and two propeller bevel pinions 14 and 14'. More precisely, the first propeller shaft 12 bears at its upstream end a first propeller bevel pinion 14, and bears at its downstream end the first propeller 10. Moreover, the second propeller shaft 12' bears at its downstream end a second propeller bevel pinion 14', and bears at its upstream end the second propeller 10'. According to this configuration, the first propeller bevel pinion 14 meshes with a downstream side of the motor bevel pinions 24, 34, and the second propeller bevel pinion 14' meshes with an upstream side of the motor bevel pinions 24, 34. Consequently, according to this example, the two propellers 10, 10' are contra-rotating, and both rotate in opposite directions R1 and R2 to one another.

FIG. 5 shows a modified example of the propulsion assembly shown in FIG. 2, wherein the propulsion assembly 1 comprises a mechanical reduction gear 15 disposed in the casing 50, on the propeller shaft 12, between the upstream end and the downstream end thereof. In other words, the mechanical reduction gear 15 is disposed between the propeller bevel pinion 14 and the propeller 10. In this example, the mechanical reduction gear 15 takes the form of an epicyclic gear train comprising several wheels having different diameters, in such a way as to reduce the speed of rotation of the propeller 10 with respect to the speed of rotation of the propeller bevel pinion 14, and therefore of the electric motor 20, 30. In this configuration, the propeller shaft 12 comprises two portions, one extending between the propeller bevel pinion 14 and the mechanical reduction gear 15, and the other extending between the mechanical reduction gear 15 and the propeller 10. These two portions both extend along the propeller axis A, and are therefore coaxial.

FIGS. 6A and 6B show a modified example of the propulsion assembly in a front view (FIG. 6A) and in a side view (FIG. 6B). In this modified example, the propeller axis A is still perpendicular to the motor axis X, but is disposed in a different plane to the plane wherein the motor axis X is located, i.e. the plane comprising the wing 110.

In this configuration, the propeller shaft 12 comprises a first portion 121 mechanically coupled to the motor shaft 22, 32 of the electric motors 20, 30, by way of the motor bevel pinions 24, 34. The propeller shaft 12 further comprises a second portion 122 bearing the propeller 10 (not shown in FIGS. 6A and 6B). The first and second portions 121, 122 are radially offset with respect to one another, in a direction perpendicular to the propeller axis A and to the motor axis X.

Moreover, the first and second portions 121, 122 mesh with one another by way of a train of spur gears 16. The train of spur gears 16 comprises a first wheel 161 borne by the first portion 121, at the downstream end of this latter, and a second wheel 162, borne by the second portion 122 at the upstream end of this latter, and meshing with the first wheel 161.

In this configuration, the first portion 121 of the propeller shaft 12 extends along a first axis A', perpendicular to the motor axis X and disposed in the same plane as this axis. Moreover, the second portion 122 of the propeller shaft 12 extends along a second axis A, corresponding to the propeller axis perpendicular to the motor axis X and disposed in a different plane to this axis, being offset by a distance D with respect to the first axis A'.

FIGS. 7A-7C show modified examples, wherein the propulsion assembly 1 comprises more than two electric motors. Whatever the configuration, the propeller assembly comprises at least a pair of electric motors, each of the two motors of the pair of electric motors being disposed on either side of the propeller shaft 12.

In the example of FIG. 7A, the propulsion assembly 1 comprises a pair of electric motors comprising two electric motors 20, 30 disposed on either side of the propeller shaft 12, i.e. facing one another on each side of the propeller shaft 12, in such a way that the axis of rotation of each of these motors extends along the motor axis X, perpendicular to the propeller axis A.

In the examples of FIGS. 7B and 7C, the propulsion assembly 1 comprises two pairs of electric motors each comprising two electric motors. A first pair of motors comprises two electric motors 20, 30 with coaxial axes of rotation, extending along a first motor axis X1 perpendicular to the propeller axis 12. A second pair of motors comprises two electric motors 20', 30' of coaxial axes of rotation, extending along a second motor axis X2 perpendicular to the propeller axis 12, and parallel to the first motor axis X1. The second motor axis X2 is in recess with respect to the first motor axis X1 in the upstream direction (with respect to the propeller, not shown in FIGS. 7A to 7C). In this example the propeller axis 12, the first motor axis X1 and the second motor axis X2 all extend in one and the same plane, also comprising the wing 110.

The examples shown are not limiting, it being possible to envision a greater number of pairs of electric motors, for example three, four or more.

The propulsion assembly 1 can also comprise an odd number of electric motors. FIGS. 7A and 7C illustrate examples wherein the propulsion assembly 1 comprises three and five electric motors respectively. In this configuration, in addition to the pair(s) of electric motors disposed on either side of the propeller shaft 12, an additional electric motor 40 is disposed at the end of the propeller shaft 12, opposite the end bearing the propeller (not shown in FIGS. 7A-7C), of necessity single in this scenario. In particular, the axis of rotation of this additional electric motor 40, more precisely the axis of rotation of the rotor of this motor, is parallel to the propeller axis 12, contrary to the electric motors of the pair or pairs of electric motors, and is coupled directly to the propeller shaft 12.

FIG. 8 is a detailed view of the propulsion assembly 1 according to the example of FIG. 7B, according to which it comprises four electric motors, i.e. two pairs of electric motors. In this scenario, the propeller shaft 12 bears a first propeller bevel pinion 141, meshing with the motor bevel pinions 24, 34 of the electric motors 20, 30 of the first pair of electric motors. Furthermore, the propeller shaft 12 bears a second propeller bevel pinion 142, disposed further upstream along the propeller shaft 12 than the first propeller bevel pinion 141, with respect to the propeller 10, in such a way as to mesh with the motor bevel pinions 24', 34' of the electric motors 20', 30' of the second pair of electric motors. Note that the bevel pinion 24' is borne by the motor shaft 22' of the electric motor 20', and the bevel pinion 34' is borne by the motor shaft 32' of the electric motor 30', the motor shafts 22' and 32' being both coaxial with the second motor axis X2.

A second embodiment of the invention will be described with reference to FIG. 9. According to this embodiment, a propulsion assembly 1' according to this summary is applied to an aircraft 100' of drone type, having an unconventional wing 110', comprising a lattice structure.

According to this lattice structure, the wing 110' comprises an annular main arm 115, and a plurality of arms interconnected inside this annular arm, as illustrated on the right-hand part of FIG. 9. These different arms are connected to the annular main arm 115 in such a way as to form connection nodes 114, each connection node 114 corresponding to the junction of three arm portions. The wing 110', comprising the different arms and connection nodes, extends in a horizontal plane, when the aircraft is grounded. A propeller 10' is disposed at each of these connection nodes 114, such that the propeller axis A extends vertically, when the aircraft is set on the ground.

The left-hand part of FIG. 9 shows a detail view of a junction between three arm portions of the wing 110', at one of the connection nodes 114. The propeller 10' is borne by a propeller arm 120, schematically represented in FIG. 9. Furthermore, an electric motor is disposed in each of the arms of the wing 110', at the connection node 114, in such a way as to be coupled with the propeller arm 120. More precisely, a first arm 111' of the wing 110' comprises a first electric motor 210, the axis of rotation of which is a first motor axis X1 extending along the axis of this first arm. A second arm 112' of the wing 110' comprises a second electric motor 220, the axis of rotation of which is a second motor axis X2 extending along the axis of this second arm. A third arm 113' of the wing 110' comprises a third electric motor 230, the axis of rotation of which is a second motor axis X3 extending along the axis of this third arm.

Each of these three electric motors 210, 220, 230 comprises a motor shaft (not shown) coupled with the propeller shaft 120, by way of bevel pinions (not shown). Thus, each of the motor axes X1, X2, X3 is perpendicular to the propeller axis A. According to this embodiment, the main axis of the wing 110' corresponds to the axis along which each arm of the wing extends. Since the arms have a cylindrical shape, the main axis of these arms is therefore the axis of these cylinders.

A third embodiment of the invention will be described with reference to FIG. 10. According to this embodiment, a propulsion assembly 1" according to this summary is applied to an aircraft 100" of helicopter type, having an unconventional wing 110" incorporated into an upper wall of the helicopter cabin, as illustrated in the right-hand part of FIG. 10. A propeller 10" is disposed on this upper wall.

The left-hand part of the FIG. 10 shows a schematic detail view of the wing 110", particularly of the upper wall of the helicopter cabin, in a side view and a top view. This comprises a plurality of electric motors disposed in a star configuration around the propeller shaft 120 bearing the propeller 10", such that each of these electric motors is mechanically coupled with this shaft 120.

More precisely, the propulsion assembly 1" comprises eight electric motors 210, 220, 230, 240, 250, 260, 270, 280. In this example, the motors 210 and 250 are movable about a first motor axis X1, the motors 220 and 260 are movable about a second motor axis X2, the motors 230 and 270 are movable about a third motor axis X3, and the motors 240 and 280 are movable about a fourth motor axis X4. Each of the motor axes X1, X2, X3 and X4 is perpendicular to the propeller axis A.

Given the architecture of a helicopter, wherein the axis of rotation of the propeller is vertical, the main axis of the wing 110" thus corresponds to a direction extending in a horizontal plane, perpendicular to the axis of rotation of the propeller. Consequently, any direction extending in this horizontal plane constitutes a main direction of the wing 110". Thus, each of the motors 210 to 280 extends in a main direction of the wing 110".

Although this invention has been described with reference to specific exemplary embodiments, it is obvious that modifications and changes may be made to these examples without departing from the general scope of the invention as defined by the claims. In particular, individual features of the different embodiments illustrated/mentioned can be combined in additional embodiments. Consequently, the description and drawings must be considered in an illustrative sense rather than a restrictive one.

The invention claimed is:

1. An aircraft comprising a wing extending along a main axis and a propulsion assembly for an aircraft comprising:
   at least two electric motors configured to be disposed in a wing of the aircraft and each comprising a rotor having a motor shaft movable about a motor axis, and
   at least one propeller including a first propeller and a second propeller, the first propeller borne by a first propeller shaft movable about a propeller axis and mechanically coupled to the motor shaft of the at least two electric motors, the propeller axis being perpendicular to the motor axis of the at least two electric motors, wherein the motor shaft of each of the electric motors bears a motor bevel pinion, and the first propeller shaft bears a first propeller bevel pinion meshing with the motor bevel pinion borne by the motor shaft of each of the electric motors, and wherein the motor axis of the at least two electric motors is parallel to the main axis of the wing, the propulsion assembly comprising a second propeller oriented in an opposite direction to the first propeller and borne by a second propeller shaft separate from the first propeller shaft, the second propeller shaft being movable about the propeller axis in an opposite direction of rotation to the first propeller, the second propeller shaft including a second propeller bevel pinion meshing with the each of the motor bevel pinions.

2. The aircraft as claimed in claim 1, wherein a tapered part of the first propeller bevel pinion is oriented in an opposite direction to the propeller, or the tapered part of the first propeller bevel pinion is oriented in the direction of the propeller.

3. The aircraft as claimed in claim 1, wherein the at least two electric motors are disposed on either side of the propeller shaft in such a way as to form a first pair of electric motors, the motor axis being a first motor axis, the propulsion assembly comprising at least a second pair of electric motors each comprising a rotor having a motor shaft movable about a second motor axis parallel to the first motor axis.

4. The aircraft as claimed in claim 3, wherein the propeller shaft comprises as many propeller bevel pinions as there are pairs of electric motors.

5. The aircraft as claimed in claim 1, wherein the two electric motors are entirely disposed in a region of the wing nearer to a leading edge of the wing than to a trailing edge thereof.

6. The aircraft as claimed in claim 1, wherein the wing does not carry any nacelle.

7. The aircraft as claimed in claim 1, wherein the first propeller bevel pinion is disposed on an upstream end of the first propeller shaft and a downstream side of each of the motor bevel pinions are meshed with the first propeller bevel pinion.

8. The aircraft as claimed in claim 1, wherein the second propeller bevel pinion is disposed on a downstream end of the second propeller shaft and an upstream side of each of the motor bevel pinions are meshed with the second propeller bevel pinion.

9. The aircraft as claimed in claim 1, further comprising a mechanical reduction gear disposed between the first propeller bevel pinion and the at least one propeller.

* * * * *